3,573,153
LAMINATED FOAM PRODUCTS AND
THEIR PREPARATION
Joseph Henry Ryan, Jr., Claymont, Del., assignor to E. I.
du Pont de Nemours and Company, Wilmington, Del.
No Drawing. Filed June 24, 1969, Ser. No. 836,155
Int. Cl. B32b 27/00, 27/32
U.S. Cl. 161—159                                    10 Claims

ABSTRACT OF THE DISCLOSURE

Thick foam structures having a low density and high durability coupled with good cushioning performance, produced by laminating a plurality of low density, high tear strength foam sheets under a minimum of pressure and at temperatures below the melting point of the foam.

BACKGROUND OF THE INVENTION

Many efforts have been made toward the development of thick foam structures suitable for use in packaging and cushioning. For these applications, an ideal foam should exhibit low density combined with high cushioning performance and durability.

Relatively thick foam structures have previously been prepared from various substances such as polystyrene, polyurethanes and polyolefins. Thick structures of many of these materials can be formed directly by appropriate forming processes but each carries with it certain disadvantages which limit its applicability. Thick structures of polystyrene, for example, have low density and provide effective cushioning. However, when subjected to appreciable shock they tend to be frangible, and thus lose their cushioning ability. Foams of polyurethane are tougher and in many applications provide effective cushioning performance. However, in general, such foams are of higher density than is desired. They are also relatively expensive and accordingly for many applications their use is not economical.

Various polyethylene foams which are available function acceptably in some applications, but their density is not as low as would be desired for economical use in some applications.

Certain low density polypropylene foams recently made available exhibit a remarkable combination of desirable physical properties. Unfortunately, their unique method of preparation severely limits the thickness of the foam sheets. Previous attempts to laminate several of these thin plies through adhesives have been somewhat unsatisfactory, and lamination by conventional heat and pressure techniques tends to destroy the physical structure of these foams which contributes to their high cushioning ability.

SUMMARY OF THE INVENTION

The instant invention provides thick foam structures having sustained high cushioning performance and which are characterized by an overall low density and high durability with respect to rupture or tearing.

The foams of the instant invention are laminated structures consisting essentially of a plurality of bonded foam sheets of a linear, thermoplastic, non-crosslinked, crystalline polymer of film forming molecular weight, the polymer having a work-to-break value of at least 10,000 in.-lbs./in.$^3$, the foam sheets being characterized by polyhedral shaped, closed cells whose median diameter is at least 500 microns, having a maximum density of 0.03 gram/cc. and having a specific work-to-tear value of at least 250 in.-lbs./in.$^2$, the composite structure characterized in that the chemical composition of all sections cut parallel to the plane of the sheets is the same throughout the structure, and the densities of sections of the laminates which contain a sheet-sheet interface are less than 10% higher than sections with no interface.

There is further provided a unique process for the preparation of these laminar foam structures which comprises stacking a plurality of foam sheets of linear thermoplastic, non-crosslinked polymer of film forming molecular weight, the polymer having a work-to-break value of at least 10,000 in.-lbs./in.$^3$, the foam having polyhedral shaped, closed cells whose median diameter is at least 500 microns, the foam sheet having a specific work-to-tear value of at least 250 in.-lbs./in.$^2$ and a density of less than 0.03 gram/cc.; heating the stack of sheets to a temperature of about from 10° C. to 35° C. below the melting point of the foam sheet; and applying an external pressure of up to about 5 p.s.i. to form a unitary foam structure.

DESCRIPTION OF THE PREFERRED EMBODIMENTS

The individual foam sheets from which the instant laminated structures are made can be produced as described in Parrish, copending, coassigned U.S. Pat. application Ser. No. 797,312, filed on Dec. 27, 1968, as a continuation-in-part of application Ser. No. 664,781, now abandoned, hereby incorporated by reference. The foam sheets can be composed of polyolefins such as linear polyethylene or polypropylene, polyesters such as polyethylene terephthalate and polyamides. Of these, sheets formed from isotactic polypropylene are particularly preferred.

To prepare the thick laminated structures, the individual sheets are placed in a suitable press or other device, and the temperature of the stack is brought to a temperature in the range of 10° C. to 35° C. below the melting point of the foam. In the case of a foam sheet made of isotactic polypropylene, the temperature at which the sealing can be effected is about from 140° C. to 165° C., and preferably about from 145° C. to 155° C. The heat can be provided, for example, through the platens of the press, radiant heat, or, in the case of particularly thick structures, can be supplied by a heated current of air passing through the stack of foam in the plane of the sheets.

Just enough pressure is imposed on the stack of sheets to insure that substantial contact between the sheets is made, but the pressure should not be so great as to increase the density of the composite stack unduly and in no instance should the pressure be so great as to cause substantial crushing of the individual cells of the foam sheets. A pressure of less than about 5 p.s.i. is sufficient, and, for the preferred isotactic polypropylene foams, a pressure of about from 0.1 to 3.0 p.s.i. can be used.

The particular order in which the heat and pressure are applied to the stack of foam sheets is not critical to the instant process. That is, the stack can be first heated, as with radiant heat, and then have pressure applied thereto, or first placed under pressure and subsequently heated with substantially equal effectiveness. In general, however, it is preferred to apply pressure to the stack of individual sheets first, since this minimizes any tendency toward lateral shrinkage when the plies are heated.

It is surprising that bonding of the individual layers is effected by the low pressures and temperatures in the process of the instant invention, especially since the foam structures are below the melting or flow point of the foam sheets at the time of bonding. The actual bonding mechanism of these particular foam structures is not fully understood, particularly in light of the fact that previous attempts to bond commercially available branched polyethylene foam below its melting point have been unsuccessful.

It is observed that thick polypropylene foam structures made in the temperature range of 140° C. to 160° C. can be delaminated without substantial tearing of the individual sheet. However, if the sheets are laminated at a temperature above 160° C., there is appreciable tearing of the individual sheets as they are delaminated. In general, it is not desired to delaminate the thicker sheets once they are fabricated from the thinner foam sheets but this characteristic does afford a convenient means of providing foam structures of any desired thickness, from a single supply of thick foam structures, thus simplifying the inventorying of these materials for the ultimate user. When the foam sheets are bonded according to the process of the instant invention, the density throughout the structure is uniform to the extent that in no instance is the density of the actual sheet-sheet interface more than 10% higher than adjacent sections which contain no interface. The chemical composition of sections cut parallel to the plane of the sheet is uniform, in contrast to an adhesively bonded laminate.

The products of this invention have a very low density, exhibit excellent cushioning performance and are highly durable in that they can be subjected to repetitive shock, such as occurs in shipping and handling of packaged products, without impairment of their cushioning capacity. They are well suited for use in packaging of a variety of objects including heavy duty hardware items as well as more fragile articles. The thick structures can be produced in a variety of shapes such as corner blocks, edge blocks, hinged structures, and carton inserts, and are useful in a variety of applications including athletic and veterinary padding, boat bumpers, padding for loading and boat docks, cushioning for shipping furniture and hardware and for electronic items such as TV tubes, for seat cushions, for disposable stadium cushions, for gym floor mats, wall cushioning and the like.

The structures of the instant invention can be prepared in a tubular configuration by winding the individual foam sheets around a rod or other form of the desired diameter. In this particular embodiment of the invention, the required pressure for lamination can be supplied by regulation of the tension of the winding of the foam sheet.

The laminated foam structures can be readily embossed or have integral hinges formed therein by the application of heat and pressure at the points at which a compression is desired. Exceptionally good integral hinges can be obtained by compressing the structures with heat to substantially their unfoamed thickness. A temperature of about from 5 to 35° below the melting point of the foam is usually satisfactory, that is, about from 140 to 170° C. for the preferred polypropylene foams. The pressure should be sufficient to compress the sheets, at the point of application of the pressure, to about their unfoamed thickness, but not so great as to sever the sheet if an integral hinge is desired. For a stack of from 10 to 20 sheets of the preferred isotactic polypropylene foam, a pressure of about 70 to 90 pounds per linear inch provides such compression while retaining the hinge so formed intact. Pressure can be provided, for example, by a platen type of press such as a Carver press. The compressions can be obtained by fastening angle irons, for example, 90° angle irons, on one platen of such a press. Heat can be conveniently provided through the platens of the press or by other, external, means. The unique structural integrity of such hinged structures is due in part to the fact that the local density is inversely proportional to the thickness. That is, the same quantity of material is present at the point of the hinge as in the rest of the structure, in direct contrast, for example, to articles prepared in a mold.

The invention is further illustrated by the following example of one specific embodiment.

Example

A stack of 20 sheets of 1/16 inch thick polypropylene foam is assembled in a press, aligning the individual sheets along their machine direction axes. The individual sheets, having a density of .016 gram/cc., are prepared as described in Example 1 of aforementioned Parrish application Ser. No. 797,312. The platens of the press are brought to a clearance of about 1 inch, so as to apply an initial pressure of approximately 3 p.s.i., and the assembly is brought to a temperature of 150° C. by heating through the platens of the press. The heating element is turned off and the press is allowed to cool for a period of about three minutes, after which the assembly is removed from the press. The individual plies are bonded into a single composite, approximately one inch thick. Similar composites are made at temperatures in the range of 145° C. to 155° C.

Samples of the composite are sectioned in the plane of the adhered sheets. Densities of sections containing a sheet-sheet interface are less than 10% greater than sections containing no interface. The thick foam structure has a substantially uniform density of about 0.02 gram/cc.

The composite foam structures remain well adhered even under relatively severe use conditions. However, if desired, the structures can be peeled apart to provide foam structures of the thickness required for specific applications.

I claim:
1. A laminated structure consisting essentially of a plurality of bonded foam sheets of a linear, thermoplastic, non-crosslinked crystalline polymer of film forming molecular weight the polymer having a work-to-break value of at least 10,000 in.-lbs./in.$^3$, the foam sheets being characterized by polyhedral shaped, closed cells whose median diameter is at least 500 microns, having a maximum density of 0.30 gram/cc. and having a specific work-to-tear value of at least 250 in.-lbs./in.$^2$, the composite structure characterized in that the chemical composition of all sections cut parallel to the plane of the sheets is the same throughout the structure, and the densities of sections of the laminates which contain a sheet-sheet interface are less than 10% higher than sections with no interface.

2. A laminated structure of claim 1 wherein the polymer is isotactic linear polypropylene.

3. A laminated structure of claim 1 having an integral hinge formed therein, the thickness of the structure at the point of the hinge approximating the unfoamed thickness of the polymer.

4. A process for the preparation of laminar foam structures which comprises stacking a plurality of foam sheets of linear thermoplastic, non-crosslinked polymer of film forming molecular weight, the polymer having a work-to-break value of at least 10,000 in-lbs./in.$^3$, the foam having polyhedral shaped, closed cells whose median diameter is at least 500 microns, the foam sheet having a specific work-to-tear value of at least 250 in.-lbs./in.$^2$ and a density of less than 0.03 gram/cc.; heating the stack of sheets to a temperature of about from 10° C. to 35° C. below the melting point of the foam sheet; and applying an external pressure of up to about 5 p.s.i. to form a unitary foam structure.

5. A process of claim 4 wherein the polymer consists essentially of linear isotactic polypropylene.

6. A process of claim 5 wherein the stack is heated to a temperature of about from 140° C. to 165° C.

7. A process of claim 6 wherein the stack is heated to a temperature of about from 145° C. to 155° C.

8. A process of claim 5 wherein the pressure applied to the stack is about from 0.1 to 3.0 p.s.i.

9. A process of claim 4 wherein the stack is heated prior to the application of pressure.

10. A process of claim 4 wherein the pressure is applied to the stack prior to heating.

References Cited

UNITED STATES PATENTS

| | | | |
|---|---|---|---|
| 2,878,153 | 3/1959 | Hacklander | 161—190 |
| 3,213,071 | 10/1965 | Campbell | 161—252 |
| 3,227,664 | 1/1966 | Blades et al. | 260—2.5E |
| 3,384,531 | 5/1968 | Parrish | 161—159 |
| 3,159,700 | 12/1964 | Nakamura | 264—321 |
| 3,447,199 | 6/1969 | Trimble | 264—320 |

MORRIS SUSSMAN, Primary Examiner

U.S. Cl. X.R.

156—306; 161—252